Jan. 17, 1928.

S. I. ANDERSON 1,656,156

SPREADER ON END BED OF MOLDING MACHINE

Filed March 2, 1926

Standard I. Anderson, Inventor

By Geo. W. Bullard,

Attorney

Patented Jan. 17, 1928.

1,656,156

UNITED STATES PATENT OFFICE.

STANDARD I. ANDERSON, OF TACOMA, WASHINGTON.

SPREADER ON END BED OF MOLDING MACHINE.

Application filed March 2, 1926. Serial No. 91,671.

My invention relates to wood-working machines in which wood moldings are made; and the objects of my invention are, first to provide a means for holding the moldings in true position and alinement on the end bed of the molding machine after they have passed beyond the cutting knives; and second, to provide a spreading device that can be fixed directly to the end bed of the molding machine and be adjusted to any width of molding being made thereon.

I attain these objects by means of the device illustrated in the accompanying drawing in which—

Figure 1:
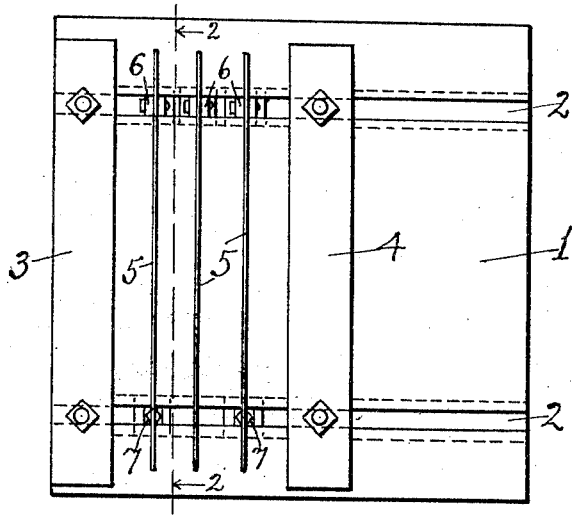
Figure 2:
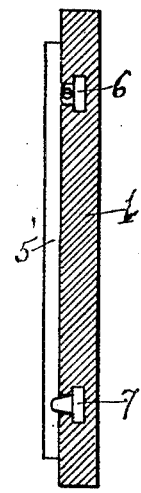
Figure 3:
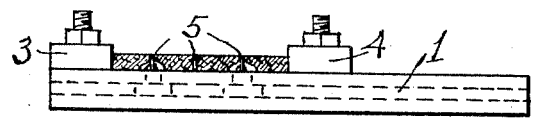
Figure 4:
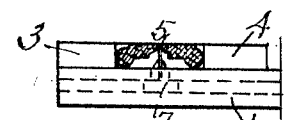
Figure 5:
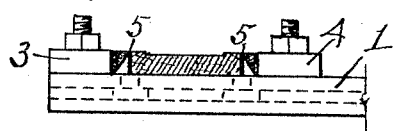
Figure 6:
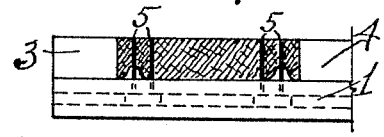
Figure 7:
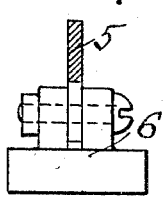
Figure 8:
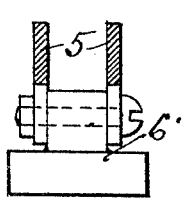
Figure 9:
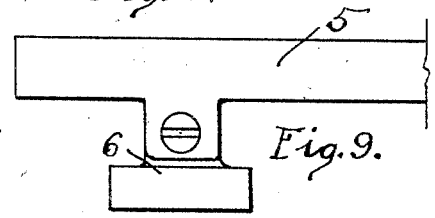
Figure 10:
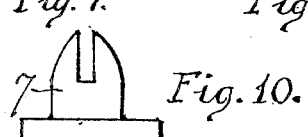

Figure 1 is a top view of the end bed of a molding machine with three of my newly invented spreaders shown in position thereon; Fig. 2 is a vertical section of Fig. 1 on the line 2—2, showing a side view of the spreader bar and means for attaching and adjusting the same; Fig. 3 is a rear view of Fig. 1 with moldings shown between the newly invented spreaders; Figs. 4, 5 and 6 are partial end views of the end bed which show the newly invented spreaders as used between moldings of different width and thickness; Fig. 7 is a full size view of the adjustable holder of a single spreader bar; Fig. 8 is the same for holding a double spreader bar; Fig. 9 is a side view of Fig. 8; and Fig. 10 is a view of the adjustable support for the rear end of the spreader bar when required for certain forms of moldings.

Similar characters refer to similar parts in the several views.

Heretofore spreader bars have been held in position from above the end bed of the molding machine by being inserted in saw cuts in a hard wood plank or block fixed on the machine for that purpose. This method of mounting the spreader bars is tedious and at times unstable, great care being required to fix the spreader bars at the width desired. In my invention the spreader bars are mounted directly on the end bed of the molding machine and can be adjusted to the width of each molding and be held uniformly in an upright position as required between the moldings.

Referring more in detail to the drawing, the benefits of my invention will be apparent from reading the following specifications connected therewith.

The end bed of the molding machine is indicated by 1 in the several figures. This is a heavy iron plate set at the rear end of the molding machine to receive and hold the moldings in level alinement as they come from the cutting knives. The end bed plate has two T-slots 2—2 to which the side guide 3 is bolted to hold the molding or moldings in vertical alinement. An opposite side guide 4 may be used when required for a multiple of moldings as shown in Figs. 3 to 6 inclusive.

My improved spreader comprises a light metal bar 5, its front end attached to a headed vertical stud 6, perforated and loosely inserted in the forward T-slot 2. The rear end is to be set in a slotted stud 7 with its head fitted in the rear T-slot 2. This bar 5 or a multiple of bars are to be made of suitable thickness and of such width as the thickness of the moldings being cut may require. The holders 6 designed for the forward end are designed to hold one bar as shown in Fig. 7 or for two bars as shown in Figs. 8 and 9, the latter being for thin moldings as will be seen in Fig. 6. The holder shown in Fig. 10 is designed to hold the rear end of the bar 5 in a vertical position when the moldings are cut out on the under side as seen in Figs. 3 and 4.

In using my improved spreaders, the bars 5 are selected of the width required for the moldings to be run and are bolted to the holders 6 as seen in Figs. 7, 8 and 9. The holders are then inserted into the forward T-slot 2 and set in position as shown in Fig. 1, or other figures as required. The side guides and the spreaders are each set to the proper vertical alinement for the moldings to be cut when the work can proceed. It will be observed the spreaders are self-adjusting to some extent but are held in a true vertical position and will stay the moldings in a square position parallel with the end bed 1. The rear holder 7 is to be used when most of the lower side of the molding is cut away as shown in Fig. 4, when each molding will likewise be held square and parallel with the end bed. By being so held the moldings will be held so as to cut clean and true to the end of the wood material being worked in the molding machine.

It will be seen that my improved spreaders as shown and described obtain the end desired, are more effective than other forms of spreaders now in use and are more economical in the saving of time and material.

Having described my invention, I claim—

A wood molding machine having an end bed, said end bed made with T-slots crosswise therein and to which side guides are bolted thereon, the attachment on and combination with said fixed end bed, of metallic spreader bars vertically mounted and in alinement with the moldings passing over said end bed, and each of said spreader bars attached to a head ended stud loosely fitted within the forward T-slot of said end bed and a head ended stud loosely fitted in the rear T-slot, said stud having a pointed top with a vertical slot therein to receive and hold the rear end of said spreader bars in an upright position as set forth and described.

STANDARD I. ANDERSON.